United States Patent [19]
Gabriel

[11] 4,109,741
[45] Aug. 29, 1978

[54] MOTORIZED UNICYCLE WHEEL

[76] Inventor: Charles L. Gabriel, P.O. Box 346, Mims, Fla. 32754

[21] Appl. No.: 820,377

[22] Filed: Jul. 29, 1977

[51] Int. Cl.² .......................... B62K 1/00; B62M 7/12
[52] U.S. Cl. ..................................... 180/21; 180/65 F
[58] Field of Search ............... 180/21, 10, 65 R, 65 F, 180/34, 1 R, 1 G; 280/11.11 E, 205, 206; 310/67; 272/1 R

[56] References Cited

U.S. PATENT DOCUMENTS

| 627,596 | 6/1899 | Schutte | 280/205 |
| 3,224,785 | 12/1965 | Stevenson | 180/1 G X |
| 3,306,626 | 2/1967 | Kawada | 280/205 |
| 3,399,742 | 9/1968 | Malick | 180/21 |

FOREIGN PATENT DOCUMENTS

| 920,950 | 12/1954 | Fed. Rep. of Germany | 180/10 |
| 477,817 | 2/1953 | Italy | 280/205 |

Primary Examiner—Kenneth H. Betts
Attorney, Agent, or Firm—Scrivener, Parker, Scrivener and Clarke

[57] ABSTRACT

A unicycle wheel has a fixed unit having fixed pedals on either side thereof on which the operator stands, and a rotatable ground engaging unit mounted on the fixed unit and forming a hollow body with it. Drive means are mounted within the hollow body together with means operated upon forward or rearward tilting of the pedals by the operator to rotate the wheel in either direction and to control its speed of movement in response to the degree of tilting.

3 Claims, 3 Drawing Figures

MOTORIZED UNICYCLE WHEEL

BACKGROUND OF THE INVENTION

The general field of the invention is that of mobile vehicles and, more particularly, those vehicles known as unicycles. In the general field of unicycles there are those which are operated by movable pedals which the rider moves in circular paths with his feet, and others which are operated by power, and the invention relates to unicycles of the latter type.

SUMMARY OF THE INVENTION

The invention provides a unicycle wheel having a fixed unit with external diametrically extending fixed pedals thereon on which the rider stands, a rotatable ground engaging unit which with the fixed unit forms a hollow body, power operated means for rotating the rotatable unit disposed within the hollow body and being operative by movement of the pedals to control the direction and speed of rotation of the rotatable unit and therefore the movement of the vehicle on the ground surface.

DESCRIPTION OF THE INVENTION

Figure 1:
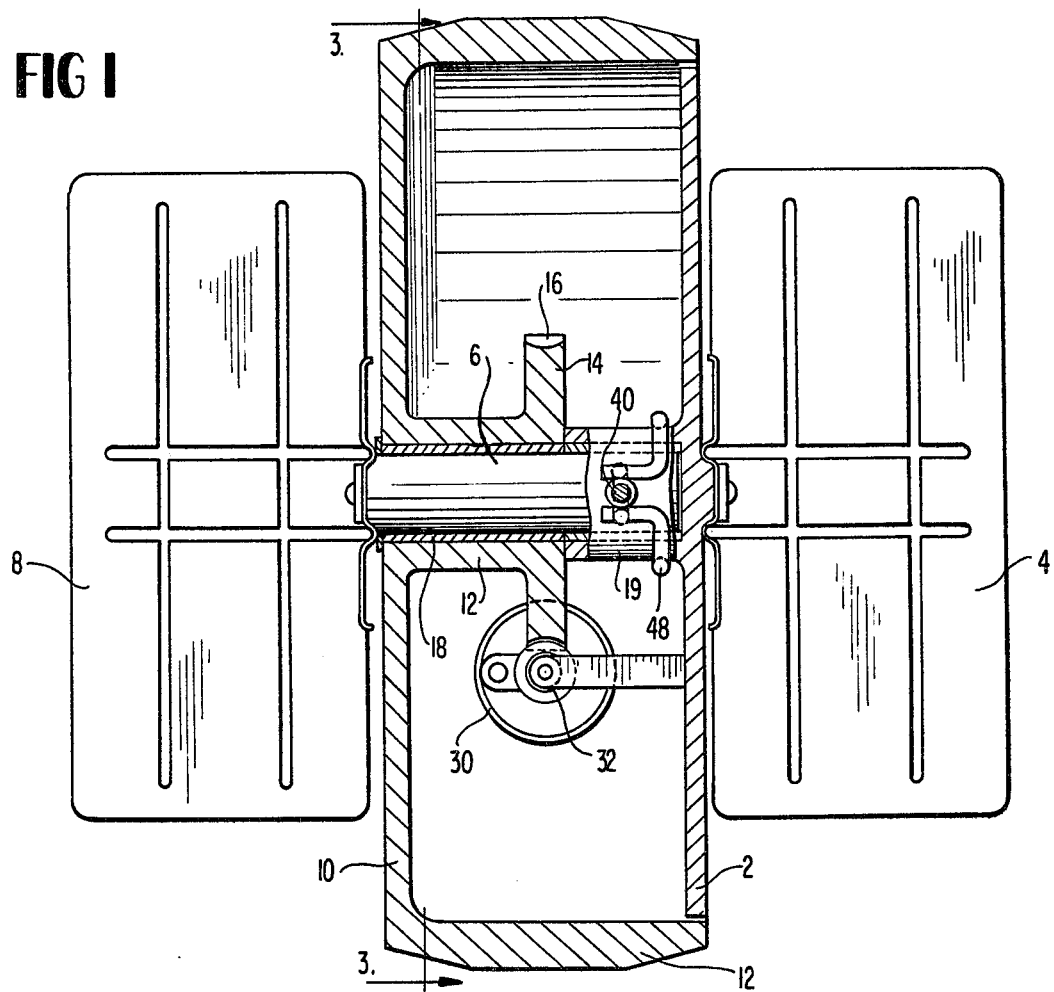
FIG. 1 is a horizontal diametrical view, partly in section, of the unicycle wheel provided by the invention.
Figure 2:
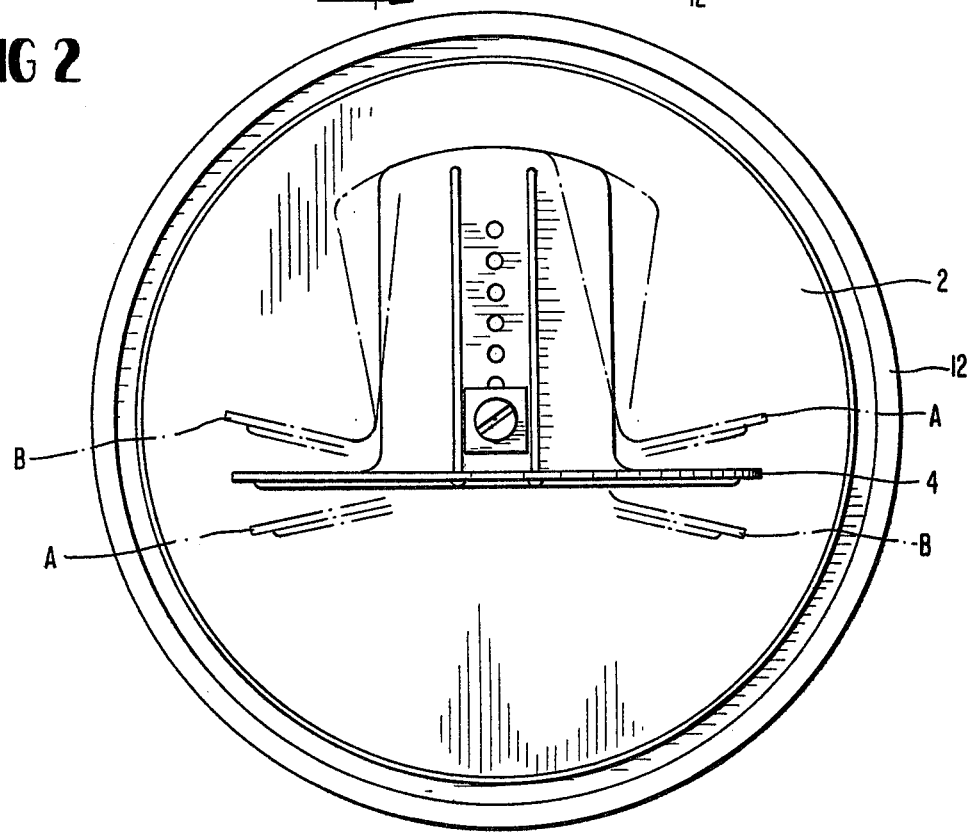
FIG. 2 is a side elevational view of the unicycle wheel.

The unicycle wheel comprises a hollow body having a fixed unit having laterally spaced pedals which supports the rider, and a rotatable ground-engaging unit which is mounted on the fixed unit. The fixed unit comprises a circular plate 2 having a pedal 4 fixed to its outer surface and extending diametrically thereof and a shaft 6 which extends at a right angle to the plate from the center of the plate in the direction away from pedal 4, and has second pedal 8 mounted on its outer end. The rotatable unit of the wheel comprises a cup-shaped body having a flat, circular bottom 10 which is parallel to and spaced from the fixed plate 2 at a position just inboard the pedal 8. A cylindrical peripheral wall 12 extends from the bottom plate 10 toward fixed plate 2 and terminates in a peripheral edge adjacent the periphery of the fixed plate. The fixed and rotatable units form a hollow body having a rotatable peripheral wall 12 which engages the ground surface in the use and operation of the unicycle wheel and having normally horizontally disposed co-planar pedals on the opposite sides of the hollow body on which the rider stands. The pedals and plate 2 are mounted for fore-and-aft rocking movement with respect to the rotatable unit, as illustrated in FIG. 2 and as will be described more fully. The rotatable unit is rotatably mounted on shaft 6 by means of a cylindrical hollow shaft 12 which extends inwardly of the hollow body from the center of plate 10 in surrounding relation to fixed shaft 6 and on its outer end, within the hollow body, has an integrally formed gear wheel 14 having external peripheral teeth 16. A bearing sleeve 18 is interposed between shafts 6 and 12. A cylindrical hollow shaft 19 extends inwardly of the hollow body from the center of the fixed plate 2 and at its outer end engages the external wall of gear wheel 14 to add stability to the entire unit.

Means are provided by the invention for causing rotation of the rotatable unit on and with respect to the fixed unit, and such means comprise a reversing electric motor 30 having armature 32 on which a helical gear 34 is provided which meshes with the peripheral teeth 16 on gear wheel 14. It will be apparent that energization of motor 30 will cause rotation of the rotatable unit through the described gearing, with consequent movement of the unicycle along the ground surface.

Figure 3:
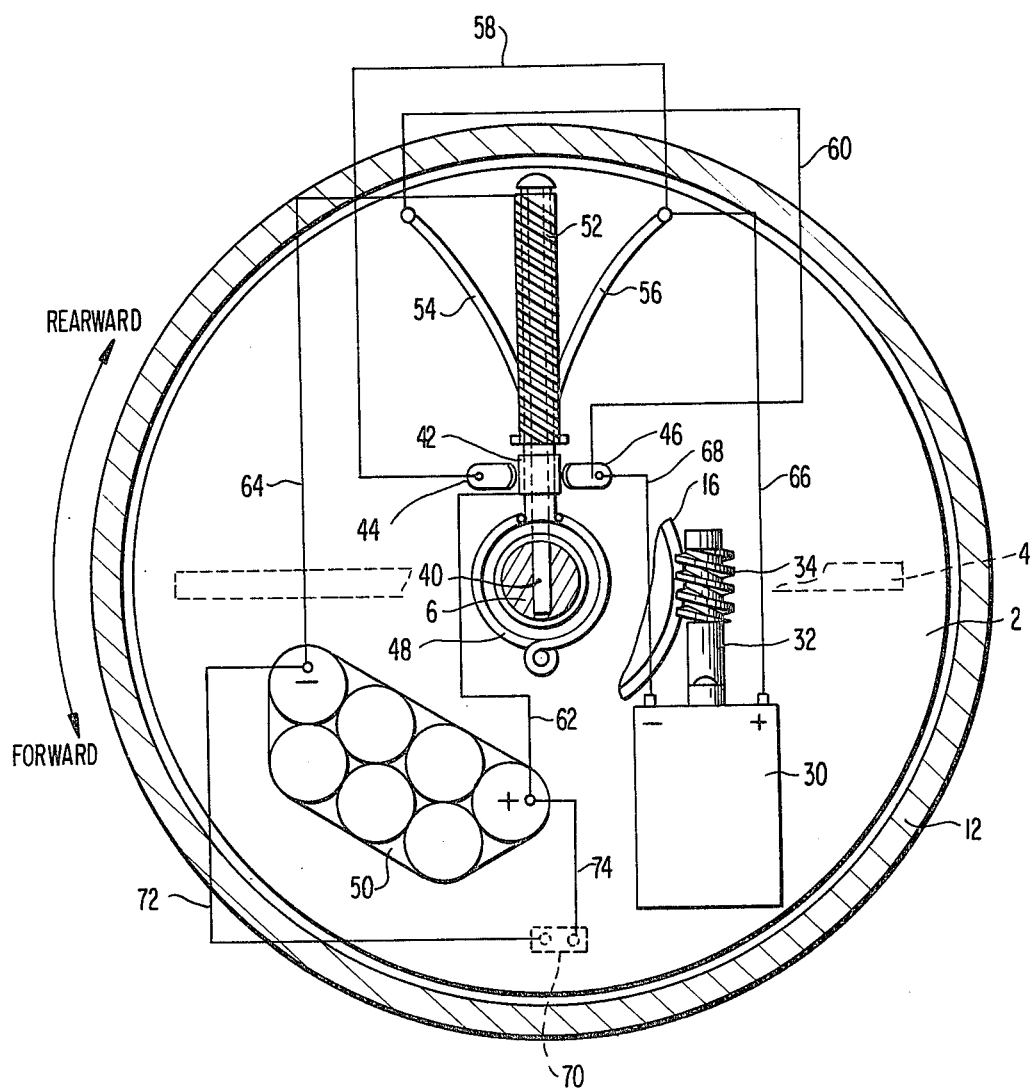
FIG. 3 is a sectional view taken on line 3—3 of FIG. 2 showing the driving means in elevation and including a circuit diagram of the means for energizing the driving means.

Means are provided within the hollow wheel for energizing the motor 30 in two directions of rotation in order to move the vehicle forward and reversely. Such means are particularly disclosed in FIG. 3 of the drawings and comprise a switch contact rod 40 which is connected to the shaft 6 and extends vertically upwardly therefrom and may therefore rock with that shaft. Above the shaft 6 the rod 40 is provided with a ring switch contact member 42 which is insulated from rod 40 and adjacent which fixed switch contacts 44, 46 are mounted on the inner surface of the fixed plate 2. An annular spring 48 tightly surrounds shaft 19, and is therefore attached to fixed disc 2, and has spaced inturned ends which engage the opposite sides of switch contact rod 40 and normally maintain the rod in centered position with its contact member 42 out of engagement with fixed contacts 44, 46.

The means and circuitry for energizing the driving motor 30 and controlling its direction and speed of rotation will now be described. A battery assembly 50 is provided within the hollow wheel and is mounted on fixed plate 2 and has positive and negative terminals. The control rod 40 is provided above contact member 42 with an exterior layer of insulating material and on this is laid a helical resistor wire 52. Two arcuate metal contact members 54, 56 are positioned on opposite sides of contact rod 40 and are mounted on fixed plate 2 at their upper ends and extend downwardly and inwardly with respect to the contact rod with their lower ends in contact with resistor wire 52 so that as the pedals, plate 2 and the contact rod 40 are moved angularly a moving tangential contact is established which is progressively higher on the resistor wire as the angle of movement of the pedals, plate and contact rod increases.

Fixed contacts 44, 46 are connected, respectively, to contact members 56, 54 by leads 58, 60. The positive terminal of battery 50 is connected to movable contact member 42 by lead 62 and the negative terminal is connected to the outer end of resistor wire 52 by lead 64. The positive terminal of motor 30 is connected to contact member 56 by lead 66 and the negative terminal is connected by lead 68 to fixed switch contact 46.

In the use and operation of the unicycle wheel the operator places the wheel in an upright position with the exterior surface of flange 12 on the ground surface and the pedals horizontal and their foot engaging surfaces upward. The operator now mounts the vehicle with his feet resting on the pedals and, for example, tilts the pedals forwardly as shown at A in FIG. 2, causing shaft 6 to rock slightly carrying with it the switch contact rod 40, which moves in the direction of the "forward" arrow in FIG. 3. Switch contacts 42, 44 are engaged and resistor wire 52 on contact rod 40 engages elongated contact member 54. A circuit is now established from the positive terminal of battery 50, through lead 62, movable contact 42, fixed contact 44, lead 58, lead 66, the positive and negative terminals of motor 30, lead 68, fixed switch terminal 46, lead 60, contact member 54, resistor wire 52 and lead 64 to the negative battery terminal. As the angular movement of the pedals is increased the point of contact between resistor winding 52 and contact member 54 will progressively move outwardly along rod 40, thus progressively decreasing the length of the resistor winding in circuit and thus progressively increasing the speed of rotation of motor 30 and the speed of movement of the wheel along the ground.

For reverse movement of the wheel the pedals are rocked in the direction of arrow B in FIG. 2, completing the following circuit which causes reverse rotation of the reversing motor 30. From the negative terminal of battery 50, lead 64, resistor winding 52, contact member 56, lead 66, the positive and negative terminals of motor 30, lead 68, fixed switch contact 46, switch contact 42 and lead 62 to the positive battery terminal.

It will be understood that the fixed switch contacts 44, 46 are mounted on plate 2 by means which yield under pressure of movable contact 42 as the pedals are rocked to actuate the mechanism.

A recharging outlet 70 is provided on plate 2 and is connected to the terminals of battery 50 by leads 72, 74.

I claim:

1. A power operated unicycle wheel, comprising a fixed member, foot supporting pedals mounted on the fixed member for angular rocking movement with the fixed member, a rotatable member comprising a cup shaped body rotatably mounted on the fixed member and forming a hollow body therewith, power operated means within the hollow body connected to the rotatable member to cause rotation thereof, and means controlled by rocking movement of the foot pedals for energizing the power operated means and controlling the direction and speed of rotation thereof.

2. A power operated unicycle wheel, comprising a fixed unit comprising a circular plate, a shaft extending at right angles from the center of the plate, two pedals extending diametrically of the plate, one on the opposite side of the plate from that of the shaft and the other at the outer end of the shaft, a rotatable unit comprising a cup shaped body rotatably mounted on the shaft and having a bottom which is parallel to the plate of the fixed unit and a surrounding flange the outer edge of which is adjacent the periphery of the plate of the fixed unit and the outer surface of which is adapted to engage the ground surface, the fixed and rotatable units forming a hollow body with the pedals exterior thereto and on opposite sides thereof, a gear wheel connected to the rotatable unit within the hollow body, a reversing electric motor mounted on the plate of the fixed unit within the hollow body and having an armature having a gear thereon in mesh with the gear wheel, and means for energizing the electric motor.

3. A power operated unicycle wheel according to claim 2, in which the pedals are mounted for limited tilting fore-and-aft movement with respect to the fixed unit, and means controlled by such tilting movement of the pedals to control the direction of rotation of the motor and of the rotatable unit.

* * * * *